United States Patent
Valencia

(10) Patent No.: US 9,678,286 B2
(45) Date of Patent: Jun. 13, 2017

(54) OPTICAL CONNECTION ASSEMBLY WITH IMPROVED GUIDING OF THE FERRULES OF OPTICAL CONTACTS, FERULE WITH REDUCED DIMENSIONS AND CONNECTION METHOD ASSOCIATED

(71) Applicant: RADIALL, Aubervilliers (FR)

(72) Inventor: Laurent Valencia, Saint Genix sur Guiers (FR)

(73) Assignee: RADIALL, Aubervilliers (FR)

( * ) Notice: Subject to any disclaimer, the term of this patent is extended or adjusted under 35 U.S.C. 154(b) by 0 days.

(21) Appl. No.: 14/718,730

(22) Filed: May 21, 2015

(65) Prior Publication Data
US 2015/0338583 A1 Nov. 26, 2015

(30) Foreign Application Priority Data
May 21, 2014 (FR) ..................................... 14 54572

(51) Int. Cl.
*G02B 6/38* (2006.01)
*H01R 13/631* (2006.01)

(52) U.S. Cl.
CPC ......... *G02B 6/3883* (2013.01); *G02B 6/3825* (2013.01); *G02B 6/3873* (2013.01); *G02B 6/3885* (2013.01); *G02B 6/3817* (2013.01); *G02B 6/3878* (2013.01); *G02B 6/3893* (2013.01); *H01R 13/631* (2013.01)

(58) Field of Classification Search
None
See application file for complete search history.

(56) References Cited

U.S. PATENT DOCUMENTS

| 6,412,988 B1 | 7/2002 | Dean, Jr. et al. |
| 6,485,192 B1* | 11/2002 | Plotts .................... G02B 6/3825 385/71 |
| 2007/0014522 A1 | 1/2007 | Yamaguchi et al. |
| 2008/0112672 A1* | 5/2008 | Lewallen ............. G02B 6/3831 385/58 |

(Continued)

FOREIGN PATENT DOCUMENTS

| EP | 2 444 827 A1 | 4/2012 |
| WO | 2006/029299 A2 | 3/2006 |

OTHER PUBLICATIONS

Jan. 12, 2015 Search Report issued in French Patent Application No. 1454572.

*Primary Examiner* — Sung Pak
(74) *Attorney, Agent, or Firm* — Oliff PLC

(57) ABSTRACT

An optical connection assembly includes a first optical contact including at least one body which is designed to envelop a first ferrule at least partly, laterally, and constitutes the receptacle for the first ferrule, at least a first guide arm extending beyond the front face of the first ferrule, and at least a second guide arm beyond which the body of the ferrule extends; a second optical contact including at least one body which is designed to envelop a second ferrule at least partly, laterally, and constitutes the receptacle for the second ferrule, and at least one guide means extending beyond the front face of the ferrule and being designed to cooperate with the first guide arm of the first optical contact, in order to carry out the guiding, then the connection, between the first and second optical contacts.

14 Claims, 7 Drawing Sheets

(56) References Cited

U.S. PATENT DOCUMENTS

| | | | |
|---|---|---|---|
| 2012/0033921 A1* | 2/2012 | Haley | G02B 6/383 385/78 |
| 2012/0039569 A1* | 2/2012 | Kevern | G02B 6/3825 385/56 |
| 2013/0216189 A1 | 8/2013 | Grinderslev et al. | |

* cited by examiner

OPTICAL CONNECTION ASSEMBLY WITH IMPROVED GUIDING OF THE FERRULES OF OPTICAL CONTACTS, FERULE WITH REDUCED DIMENSIONS AND CONNECTION METHOD ASSOCIATED

FIELD OF THE INVENTION

The present invention relates to an optical connection assembly optical contacts with ferrules.

It also relates to a multi-contact connector incorporating a plurality of such ferrules, accommodated in cavities in the multi-contact connector.

The object of the invention is to obtain firstly a precise and reliable guidance of optical contacts and also to ensure the compatibility of a ferrule for optical contact with a cavity of a standard size, initially provided for an electrical contact.

PRIOR ART

The known multi-contact connectors, for example those known by their series name EPX, ARINC 600, ARINC 404, or MIL-DTL 38999, comprise cavities, the size of which is standard, in particular the cavity known as "size 8" for simple electrical contact, or for electrical contact for transmission of data designated by the name Quadrax or Twinax.

A "size 8" cavity has a generally cylindrical form with a small diameter, the smallest diameter of which is approximately 5.60 mm, which is optimized for electrical contacts, and is therefore not optimized for the integration of optical fibers in this same cavity. In fact, the known electrical contacts do not need as much precision in terms of axial, radial and angular positioning around the axis of the connection.

For some years, adapters have been designed to make the optical contacts compatible with the standard "size 8" cavities: this is the case for example of adapters known as Luxcis or ABS1379. These compatible optical contacts necessarily incorporate only a single optical fiber.

But the increase in the densification of the optical fibers has led the designers to consider the use of ferrules, known as MT ferrules, which may each accommodate 12 to 72 fibers.

However, the transverse cross-section of a conventional MT ferrule is large to the extent that the diameter of a standard cavity of the adapters cannot accommodate it. In other words, it is impossible to insert a conventional MT ferrule in a standard "size 8" cavity.

FIGS. 1A and 1B illustrate a ferrule 10 of the MT type according to the prior art. Such a ferrule 10 receives via its rear face a bundle in the form of a band of optical fibers 7. Twelve optical channels 70, which are aligned horizontally according to a single row, open onto the front face of the ferrule 10. Each optical channel 70 is designed to accommodate an optical fiber 7 individually.

Two receptacles for cylindrical pins 11 are arranged on both sides of the row of optical channels 70. Such a ferrule cannot be inserted in a cylindrical cavity with a diameter smaller than the circle C inscribed in the rectangular cross-section. Since the transverse cross-section of the ferrule is a rectangle, the minimum diameter of the size required for such a ferrule is the distance from a top of the rectangle to its opposite top.

Patent application WO 2006/029299 A2 has proposed to reduce the transverse cross-section of an MT ferrule by modifying the arrangement of the optical channels. Thus, the ferrule 10 disclosed in this patent application, represented in FIG. 1C, comprises optical channels which are aligned, according to two superimposed rows, of six channels 71 and 72 each. Although this solution has the advantage of permitting efficient reduction of the transverse cross-section of the ferrule, it nevertheless has numerous disadvantages. Firstly, investment in a new mold is required for production of this ferrule. Secondly, the use of a standard optical band, as illustrated in FIG. 1A, is incompatible with the ferrule with two rows of superimposed optical channels. In addition, the polishing tools used for a conventional MT ferrule cannot be implemented with the ferrule with two rows of superimposed optical channels which is disclosed in this patent application. Another disadvantage is that the maximum number of optical fibers for the ferrule disclosed in this patent application is fewer than for a conventional MT ferrule, which may accommodate up to 72 fibers, i.e. a number of six rows of twelve channels each. Finally, reduction of the transverse cross-section as proposed in this application involves a distance between centers of the two pins or pin receptacles which is smaller than the conventional types, which are in particular those of measurement adapters or those of adapters on a microscope, or those on a polishing machine.

In order to make a ferrule which accommodates a plurality of optical fibers compatible with a standard cavity, another solution which would naturally occur to persons skilled in the art could have consisted of reducing the diameter of the pin receptacles, and producing pin receptacles with a reduced diameter 12, as represented in FIG. 1D. However, in addition to the disadvantages associated with the substantial investment in a mold for production of the ferrule, reduction of the diameter of the pin receptacles involves the production of new pins.

There is therefore a need to improve the ferrules for optical contact which are designed to accommodate a plurality of optical fibers, in particular in order to permit their insertion in standard "size 8" cavities, without however giving rise to a significant investment, and/or to reduction of the number of optical channels available, and/or to modification of the diameter of the pin receptacles.

Patent applications US 2013/216189A1 and US 2007014522A1, as well as patent U.S. Pat. No. 6,412,988 B1, disclose ferrules with a non-parallelepiped geometry. However, amongst these documents, the last two cited do not indicate how to put into practice the integration of the optical fibers in cavities of a multi-contact connector, and above all none of these documents discloses a solution for providing a coupling between complementary ferrules which is easy and reliable, in particular for multi-contact connectors.

There is therefore another need to improve the coupling of the ferrules for optical contact which are designed to accommodate a plurality of optical fibers, in particular in order to simplify it and make it reliable, more particularly in multi-contact connectors, The objective of the invention is to fulfil these needs at least partly.

DISCLOSURE OF THE INVENTION

For this purpose, according to one aspect, the subject of the invention is an optical connection assembly comprising:
- a first optical contact comprising at least one body which is designed to envelop a first ferrule at least partly, laterally, and constitutes the receptacle for the first ferrule, at least a first guide arm extending beyond the front face of the first ferrule, and at least a second guide arm beyond which the body of the ferrule extends;

a second optical contact comprising at least one body which is designed to envelop a second ferrule at least partly, laterally, and constitutes the receptacle for the second ferrule, and at least one guide means extending beyond the front face of the ferrule and being designed to cooperate with the first guide arm of the first optical contact, in order to carry out the guiding, then the connection, between the first and second optical contacts.

According to a first embodiment of the invention, the first ferrule and the second ferrule each have a form which is elongate according to a longitudinal axis Z and comprise a plurality of optical channels which are designed to accommodate an optical fiber individually, the optical channels being aligned according to a row, and opening onto one of the faces, known as the front face, of the first ferrule and the second ferrule, the transverse cross-section of the first ferrule and the second ferrule comprising:

two parallel segments with the same mid-perpendicular and the same length;

two profiles in the form of an arc of a circle which are convex towards the exterior of the ferrule, each of the two profiles connecting an end of a segment to the closest end of the other segment.

According to a second embodiment of the invention, the first ferrule and the second ferrule each have a form which is elongate according to a longitudinal axis Z and comprise a plurality of optical channels which are designed to accommodate an optical fiber individually, the optical channels being aligned according to a row, and opening onto one of the faces, known as the front face, of the first ferrule and the second ferrule, the transverse cross-section of the first ferrule and the second ferrule being a convex polygon with at least six sides, wherein there are:

two first parallel segments with the same mid-perpendicular and the same length;

two profiles each comprising at least two second segments, each profile connecting an end of a first segment to the closest end of the other first segment, According to a variant of the second embodiment, the transverse cross-section of the first ferrule and of the second ferrule is an octagon wherein six of the sides have equal lengths constituted by the two profiles with three segments with lengths which are equal or different.

According to a third embodiment of the invention, the first ferrule and the second ferrule each have a parallepipedic form which is elongate according to a longitudinal axis Z and comprise a plurality of optical channels which are designed to accommodate an optical fiber individually, the optical channels being aligned according to a row, and opening onto one of the faces, known as the front face, of the first ferrule and the second ferrule.

Thus, although it is simple to implement, the invention consists of defining easy guiding of a ferrule of the MT type which has been adapted by forming of the geometry of the transverse cross-section. Surprisingly, no attempt at this solution had previously been made.

A ferrule according to the first and second embodiments of the invention thus has a transverse cross-section which is reduced in comparison with that of a ferrule according to the prior art, thus allowing it to be inserted in a cylindrical cavity with a reduced diameter, such as a standard cavity of size 8, whilst retaining all the functional characteristics of a known ferrule of the MT type, and in particular a large number of optical channels, typically of twelve contacts, which may be aligned in a single row.

In addition, the adaptation of the geometric form of the transverse cross-section does not involve any change to the pins, which may therefore be standard, or any modification of the polishing calibers of the ferrule.

The guide arms according to the invention may extend as close as possible to, and preferably may conform to the adapted section of the ferrules according to the invention or the parallepipedic form according to prior art ferrules, and thus permit perfect guiding, whilst offering a big compactness to the connection assembly.

The guide arms thus allow a very accuracy of guidance while permitting the centering of the bodies of the contacts and of the ferrules the one relative to each other and this according to the three axis (X, Y, Z).

According to an advantageous variant, the first or the second ferrule comprises at least one pin receptacle which is elongate according to the axis Z, and opens onto the front face of the ferrule.

According to this variant, the second ferrule or the first ferrule may comprise at least one pin which is designed to be accommodated in a receptacle, the pin extending beyond the front face of the ferrule towards the exterior of the latter.

According to an advantageous characteristic, the body of the first optical contact and the body of the second optical contact have a generally cylindrical form.

According to an advantageous variant, the first optical contact comprises at least one second guide arm, beyond which the body of the ferrule extends. Preferably, the first optical contact comprises two second guide arms and two first guide aims which are diametrically opposite in pairs.

According to an advantageous variant, the guide means of the second optical contact consist of two pairs of two arms which are elongate according to the axis Z and diametrically opposite in pairs, whilst defining between one another four slots which are elongate according to the axis Z.

Alternatively, the guide means of the second optical contact may consist of two arms which are elongate according to the axis Z, each comprising in their interior a groove which is elongate according to the axis Z, the groove being designed to receive and guide in translation according to the axis Z a first guide arm for the first optical contact.

Advantageously, the first and second optical contacts constitute contacts which are designed to be inserted in cylindrical cavities with a standard size, known as "size 8".

According to another one of the aspects, the invention also relates to a multi-contact connector comprising:

an insert comprising a plurality of cylindrical cavities;
a first optical contact or a second optical contact of the above-described connection assembly;
at least one guide means which is designed to guide the multi-contact connector during its connection to a complementary multi-contact connector.

Finally, the invention relates to a method for connection of a multi-contact connector as previously described, with a complementary multi-contact connector as previously described, comprising the following steps:

guiding to alignment of the multi-contact connectors by means of means for guiding the connectors;
guiding to alignment of the optical contacts by means of the arm(s) and the means for guiding the optical contacts;
putting the first and second ferrules into contact, with individual placing opposite one another of their optical channels.

DETAILED DESCRIPTION

Other advantages and characteristics of the invention will become more apparent from reading the detailed description of exemplary embodiments of the invention, provided by way of non-limiting illustration, with reference to the following figures in which.

FIGS. 1A to 1D have already been commented on in detail in the preamble. They will therefore not be described hereinafter.

The terms "front" and "rear" are to be understood in the following detailed description and in the present application as a whole with reference to the direction of connection. Thus, the front face of a ferrule of an optical contact is the connection face which is designed to be connected to that of a complementary optical contact ferrule. On the other hand the rear face is that via which the optical fibers of the band are inserted into the ferrule.

Similarly, the terms "vertical", "lower", "upper", "bottom", "top", "below", "above" are to be understood with reference to a ferrule in a connection configuration with its row(s) of optical channels horizontal. Thus, an upper segment of the ferrule is that above the row of optical channels of the ferrule.

Figure 1A:
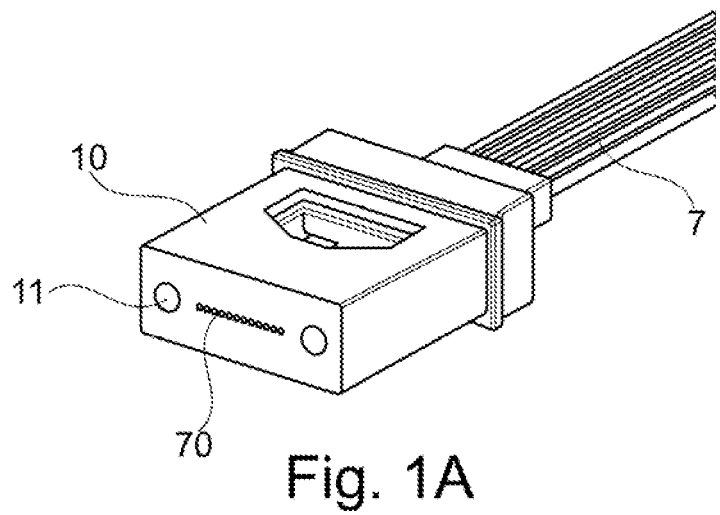
FIG. 1A to 1D are views in perspective of ferrules according to the prior art.
Figure 1B:
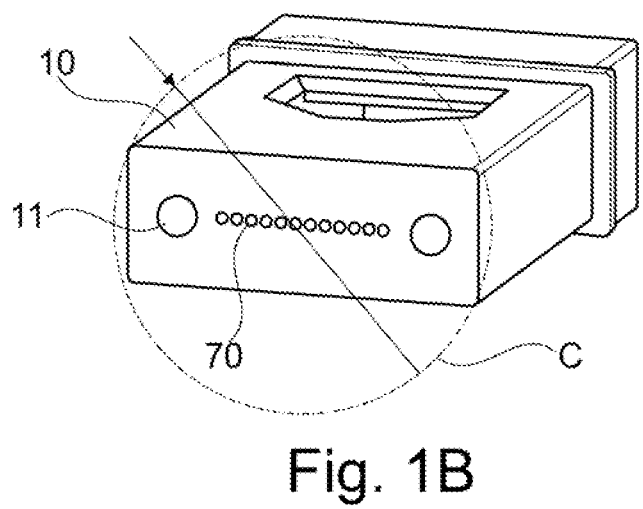
Figure 1C:
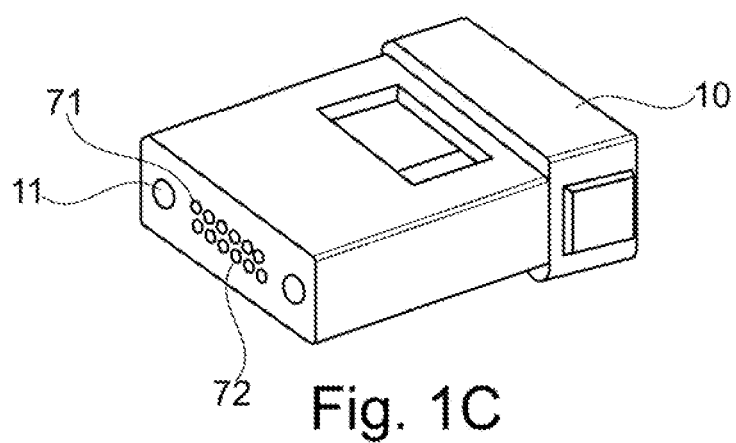
Figure 1D:
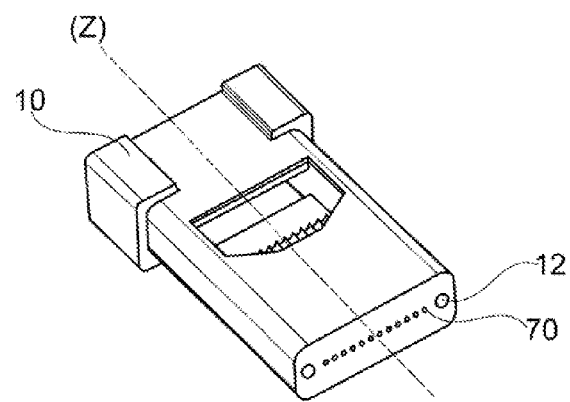
Figures 2A, 2B:
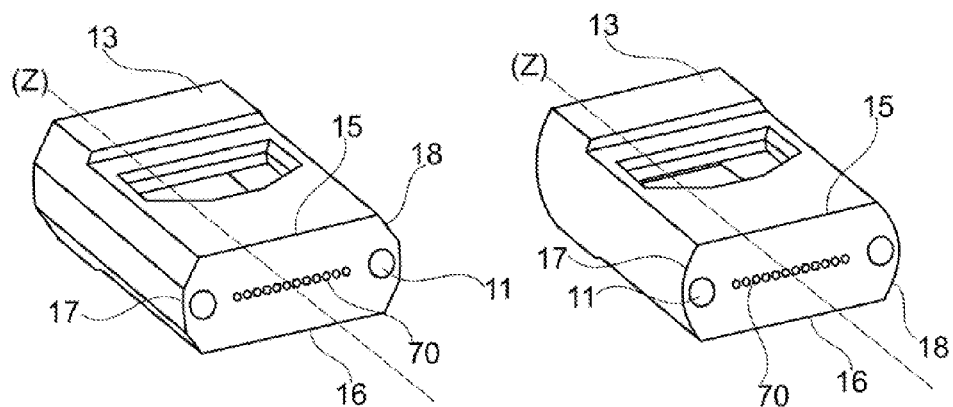
FIG. 2A is a view in perspective of an example of a ferrule according to the invention.
FIG. 2B is a view in perspective of another example of a ferrule according to the invention.

As represented in FIGS. 2A and 2B, a ferrule 13 according to the invention has a form which is elongate according to a longitudinal axis Z. In order to explain the guiding and connection according to the invention, the X and Y axes have been represented, each of the axes X, Y, Z being perpendicular to the two others.

The ferrule 13 comprises a single row of twelve optical channels 70 which open onto the front face of the ferrule. Each optical channel 70 is designed to accommodate an optical fiber. The assembly of the optical fibers in the form of a band is inserted via the rear face of the ferrule. Two pin receptacles 11 are provided on both sides of the row of optical channels 70.

In the examples represented, there is only a single row of twelve channels, but it is possible to have a plurality of rows of channels in order to increase the number of fibers available on a single ferrule, without however modifying the geometry of the ferrule. Thus for example it may be envisaged to produce a ferrule with six rows of twelve channels, the rows being arranged according to the height of the ferrule and parallel to one another.

FIG. 2A represents an example of a ferrule 13 with geometry modified according to the invention.

The transverse cross-section of the ferrule 13 represented in FIG. 2A comprises upper 15 and lower 16 segments which are parallel, and have the same length, and the mid-perpendicular of which is combined. The transverse cross-section of the ferrule 13 also comprises two profiles 17 and 18, each comprising three segments with an equal length. Each profile 17, 18 connects an end of an upper segment 15 to the closest end of the lower segment 16. Thus, the transverse cross-section of the ferrule 13 represented in FIG. 2A is a convex octagon.

With such an octagonal ferrule 13, or any polygonal ferrule with more than 8 faces, there are all of the same elements which would be present on a ferrule with a rectangular transverse cross-section, with the advantage of reduction of the usable diameter, i.e. the nominal diameter of a cavity in which the ferrule may be inserted. In fact, the limiting diameter, i.e. the smallest diameter in which a ferrule may be inserted, is, for a convex octagon, smaller than that of a rectangle with the same length and the same width. Thus, the limiting diameter of a ferrule 13 with a convex octagonal cross-section according to the invention, is the distance from a top of the octagon to another top of the octagon. It is thus possible to envisage insertion of a ferrule 13 with a convex octagonal cross-section according to the invention in a standard "size 8" cavity, FIG. 2B represents an example of a ferrule 13 according to a second alternative of the invention. The transverse cross-section of this ferrule 13 also comprises two segments, i.e. an upper segment 15 and a lower segment 16. Unlike the ferrule represented in FIG. 2A, the two profiles 17 and 18 in FIG. 2B are in the form of an arc of a circle, which is convex towards the exterior of the ferrule. In this case, each of the two arcs of a circle connects an end of an upper segment 15 to the closest end of the lower segment 16.

The ferrules 13 according to the first and second alternatives of the invention have a transverse cross-section which is comparable to that of a ferrule according to the prior art, which allows them to be inserted in a cylindrical cavity with a reduced diameter, such as a standard size 8 cavity, whilst retaining all the functional characteristics of a known ferrule of the MT type, and in particular a large number of optical channels, typically of twelve contacts, which may be aligned in a single row. In addition, the ferrules 13 according to the invention may be produced from existing ferrules by simple adaptation of their geometric form.

Figure 3:
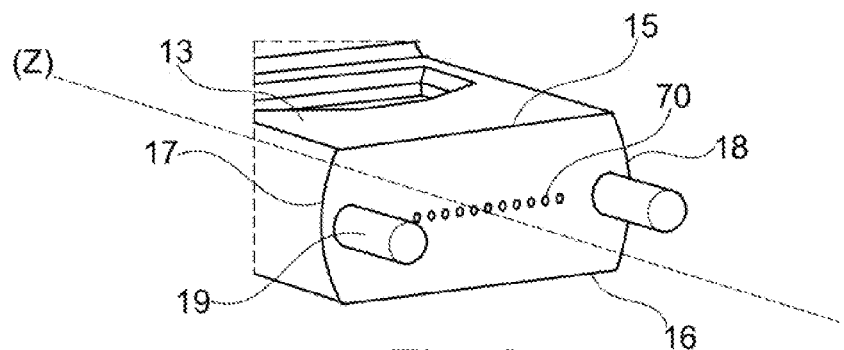
FIG. 3 is a view in perspective of a ferrule complementary to the one illustrated on FIG. 2B and the pins of which project beyond its front face.

FIG. 3 represents a ferrule 13 according to the invention, comprising a number of twelve optical channels 70 which open onto its front face, and two pins 19 which are arranged in pin receptacles 11, and extend beyond the front face of the ferrule 13, i.e. which project from the latter. These pins 19 each constitute a guide means. The ferrule 13 with pins 19 is thus known as "male", and is designed to be connected to a ferrule known as "female", the receptacles 11 of which are without pins, such as those represented in FIG. 2B.

During the connection between a male ferrule 13 such as that represented in FIG. 3, and a female ferrule 13 such as that represented in FIG. 2B, the two pins 19 enter receptacles 11 in the female ferrule, and thus guide the alignment of the male ferrule 13 relative to the female ferrule, until contact between their front faces takes place. Small chamfers at the ends of the pins 19 make it possible to compensate for any slight offsetting and other least important alignment defects.

A description has been provided above of the connection between male and female ferrules. It is also possible to envisage producing each of the two complementary ferrules according to the invention with a single pin, and thus having a connection between the two complementary ferrules which each have their pin as a guide means, and each receive a pin from the other ferrule during the connection.

Figure 4A:
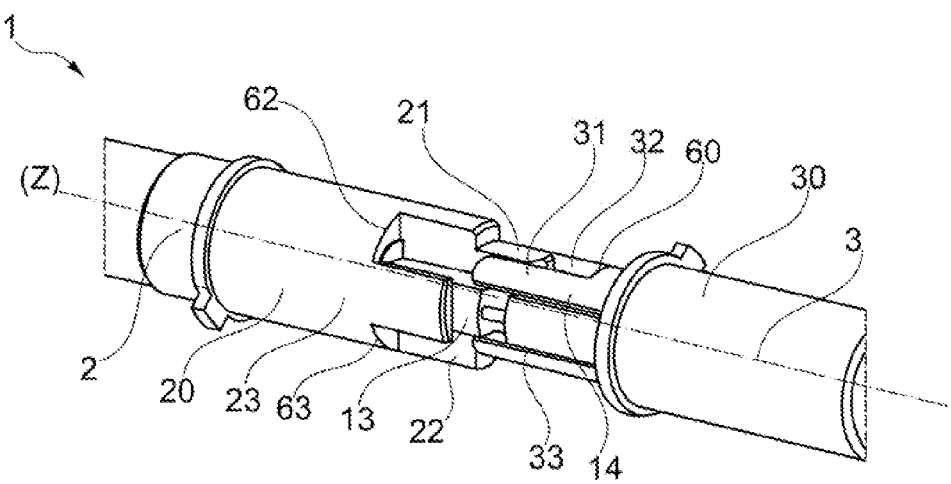
FIGS. 4A and 4B are views in perspective of a connection assembly according to a first embodiment of the invention with ferules shown on FIGS. 2B and 3, these FIGS. 4A and 4B illustrating respectively the phase of guiding of the optical contacts, and once the connection has been made.
Figure 4B:
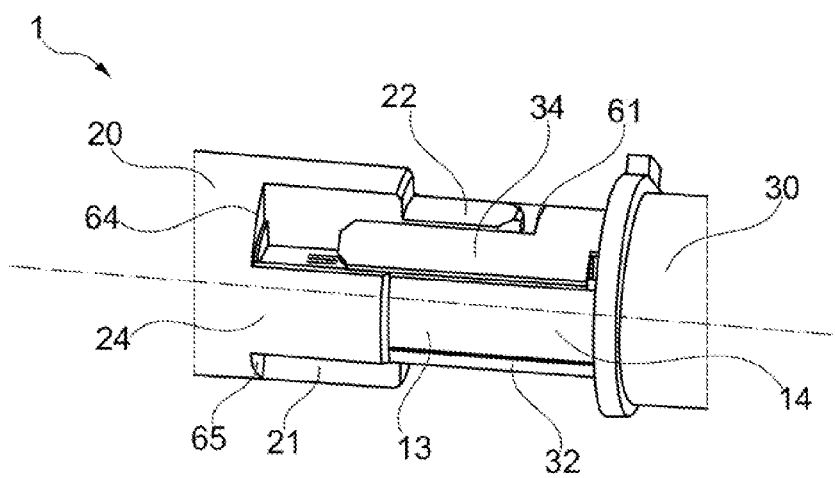

FIGS. 4A and 4B represent a connection assembly 1 according to a first embodiment of the invention. This connection assembly comprises two optical contacts 2 and 3.

The first optical contact 2 comprises a body 20, and accommodates a first ferrule 13 with a cross-section which is transverse relative to the profiles 17, 18 in the form of convex arcs of a circle towards the exterior of the ferrule, like that illustrated in FIG. 2B. The body 20 with a generally cylindrical form surrounds the ferrule 13 partly, laterally. The male ferrule 13 comprises two pins 19 which are accommodated in the pin receptacles 11.

The first optical contact 2 comprises a plurality of guide arms in the extension of the body 20. In particular, it comprises two guide arms with a longer length, known as long arms 21 and 22, with a form which is elongate according to the axis Z, and which are diametrically opposite. These long guide arms 21 and 22 extend beyond the front face of the ferrule towards the second optical contact 3.

The optical contact 2 also comprises two diametrically opposite guide arms with a shorter length, known as short arms 23 and 24. The short guide arms 23 and 24 are recessed from the front face of the ferrule.

The long 21, 22 and short 23, 24 guide arms define four slots between one another. More specifically, the guide arms 21 and 23, 23 and 22, 22 and 24, and 24 and 21 define the slots 62, 63, 64, 65 respectively between one another.

The long guide arms 21, 22 and the short guide arms 23, 24 are directly in contact with the ferrule 13 in the extension of the body 20, which acts as a receptacle for the ferrule, in order to make the cylindrical optical contact as compact as possible.

The second optical contact 3 comprises a body 30, and accommodates a second ferrule 14 with a transverse cross-section which is identical to the ferrule 13 accommodated in the first optical contact 2, such as that illustrated in FIG. 4A.

The female ferrule 14 is without pins 19. The body 30 with a generally cylindrical form surrounds the ferrule 14 partly, laterally.

The second optical contact 3 comprises two pairs of guide arms. The two arms 31 and 32 define a slot 60 between one another. The two other guide arms 33 and 34 define a second slot 61 between one another. These four arms 31, 32, 33, 34 are spaced uniformly angularly around the ferrule 14, and extend beyond the front face of the ferrule 14 towards the first optical contact 2. The guide arms 31, 32, 33 and 34 are directly in contact with the ferrule 14 in the extension of the body 30, which acts as a receptacle for the ferrule 14, in order to make the cylindrical optical contact as compact as possible.

The long guide arms 21 and 22 of the first optical contact 2 are each designed to be inserted respectively in the slots 60 and 61, whilst being guided by sliding each respectively between the arms 31, 32 and between the guide arms 33, 34. The guide arms 31, 32, 33, 34 thus form the guide means for the second optical contact 3.

The guide arms 31, 32, 33 and 34 are also each designed to be inserted respectively in the slots 62, 65, 63 and 64. The arms 31 and 33 are designed to slide on both sides of the short guide arm 23. Similarly, the arms 32 and 34 are designed to slide on both sides of the short guide arm 24.

In order to create the connection between the optical contact 2 and the optical contact 3, the following steps are thus carried out:

a/ creation of first guiding to alignment at Y and for rotation at Z by means of the long guide arms 21 and 22, which penetrate respectively into each of the slots 60 and 61 defined between the guide arms 31 and 32, and respectively between the guide arms 33 and 34.

b/ creation of second guiding to alignment at X by means of the guide arms 21, 22 and/or 31, 32, 33 and 34 on the bodies of the ferrules 13 and 14.

c/ creation of third guiding to alignment at X and Y by means of the pins 19 of the male ferrule 13, which are then placed opposite pin receptacles 11 of the female ferrule 14, and are then inserted in the latter.

d/ continuation of the guiding with the guide arms 31, 32, 33 and 34 which penetrate into the slots 62, 65, 63 and 64, until the front faces of the male 13 and female 14 ferrules are in abutment contact.

The optical contacts 2 and 3 are then connected.

Figure 5A:
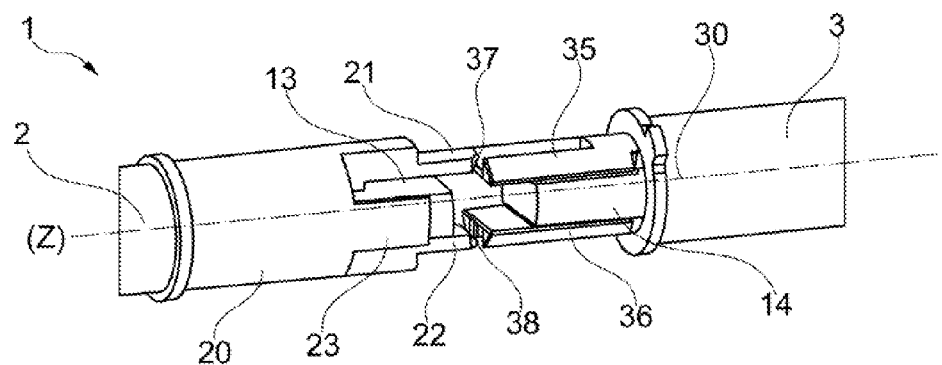
FIGS. 5A and 5B are views in perspective of a connection assembly according to a second embodiment of the invention with ferules shown on FIGS. 2B and 3, these FIGS. 5A and 5B illustrating respectively the phase of guiding of the optical contacts, and once the connection has been made.
Figure 5B:
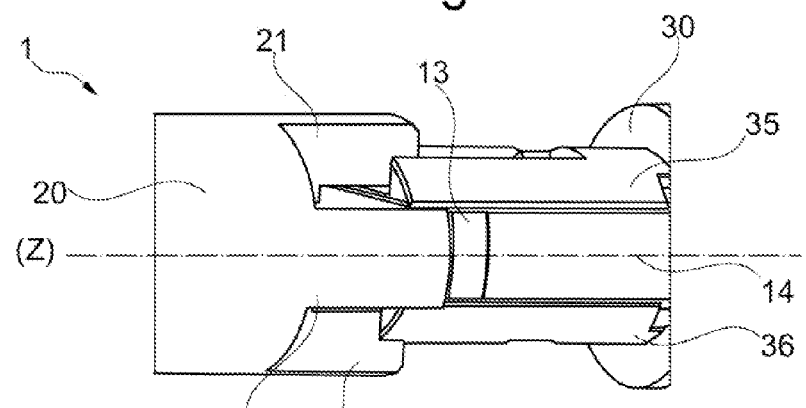

A second embodiment of the connection assembly 1 is represented in FIGS. 5A and 5B.

According to this second embodiment, the first optical contact 2 is identical to the one illustrated in FIGS. 4A and 4B previously described, and comprises a ferrule 13 with a transverse cross-section with profiles in the form of an arc of a circle.

The second optical contact 3 also comprises a ferrule 14 with a transverse cross-section identical to that of the ferrule 13. The optical contact 3 comprises a body 30 which accommodates the ferrule 14, and comprises two guide arms 35, 36, with a form which is elongate according to the axis Z, which comprise in their interior a groove 37, 38 which is also elongate according to the axis Z.

These guide arms 35, 36 extend from the body 30 of the optical contact 3 beyond the front face of the ferrule 14, towards the first optical contact 2. The grooves 37, 38 are designed to guide the guide arms 21 and 22 by sliding. Similarly, the lateral parts of the guide arms 35 and 36 are designed to slide along the short guide arms 23 and 24.

The guide arms 35 and 36 are directly in contact with the ferrule 14 in the extension of the body 30 which acts as a receptacle for the ferrule 14, in order to make the cylindrical optical contact as compact as possible.

Figure 6A:
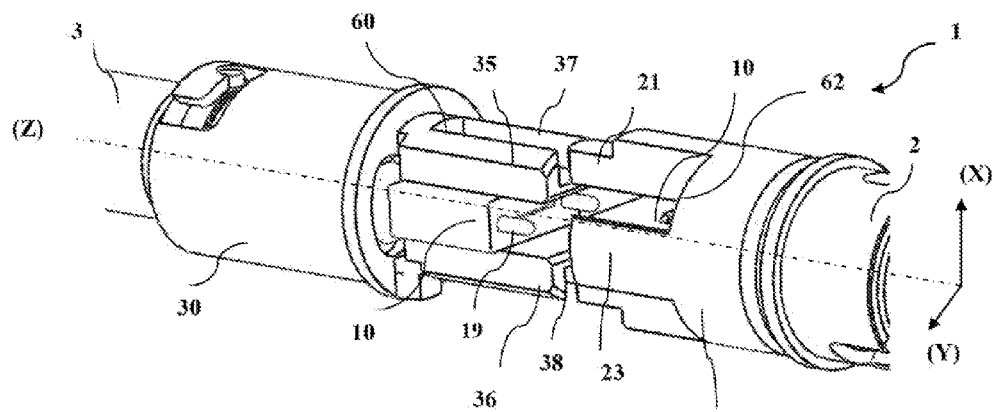
FIGS. 6A and 6B are views in perspective of a connection assembly with the same guide arms of those illustrated on FIGS. 5A and 5B but with conventional ferules with a parallelepipedic shape shown on FIGS. 1A to 1D, these FIGS. 6A and 6B illustrating respectively the phase of guiding of the optical contacts, and once the connection has been made.
Figure 6B:
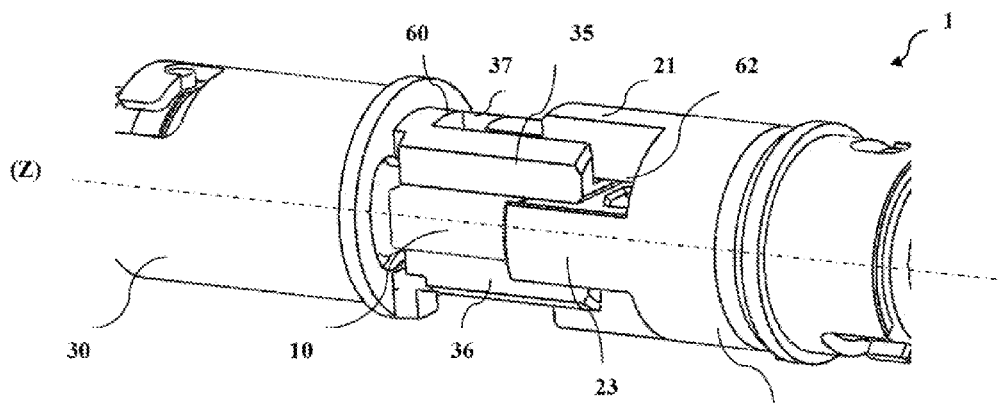

There is shown in FIGS. 6A and 6B, a connection assembly with the same optical contacts 2 and 3 and therefore with the same guide arms 21 to 24 and respectively 35 and 36 as those illustrated in FIGS. 5A and 5B.

The ferrules 10 implemented in this connection assembly have a parallelepipedic shape.

As illustrated in FIG. 6A, here also, only the guide arms 23 and 24 extend along short of the shortest main faces of the female ferrule 10 without pins and are in direct contact with them.

Guide arms 35 and 36 in turn extend along the longest main faces of the male ferrule 10 to pins 19 and are directly with them.

The steps for connection of the optical contact 2 and 3 and creation of the connection assembly 1 according to the second embodiment are as follows:

a/ creation of first guiding to alignment at X and at Y and for rotation at Z by means of the guide arms 21 and 22, which each penetrate respectively into the grooves 37, 38.

b/ creation of second guiding to alignment at X and Y by means of the pins 19 of the male ferrule 13 which are placed opposite the receptacles for pins 11 of the female ferrule 14, and are then inserted in the latter.

d/ as represented in FIGS. 5B and 6B, the lateral parts of the arms 35 and 36 are brought opposite slots 62, 63, 64 and 65 defined between the long guide arms 21 and 22 and the short guide arms 23 and 24. The lateral parts of the arms 35 and 36 penetrate into the slots 62, 63, 64 and 65. The front faces of the ferrules 13 and 14 are brought into abutment contact. The optical contacts 2 and 3 are then connected.

Figure 7:
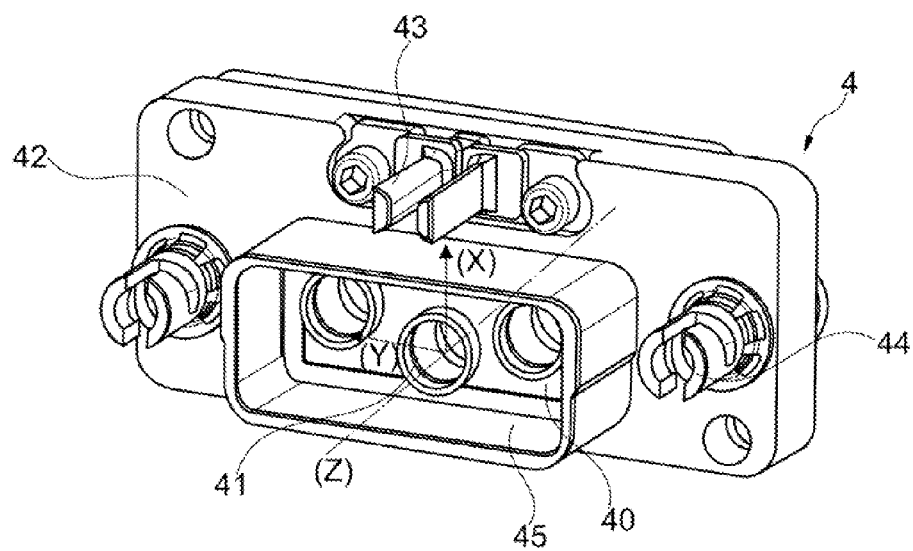
FIG. 7 is a view in perspective of a multi-contact connector of the EPX type with three cavities, before the insertion of an optical contact according to the invention.
Figure 8A:
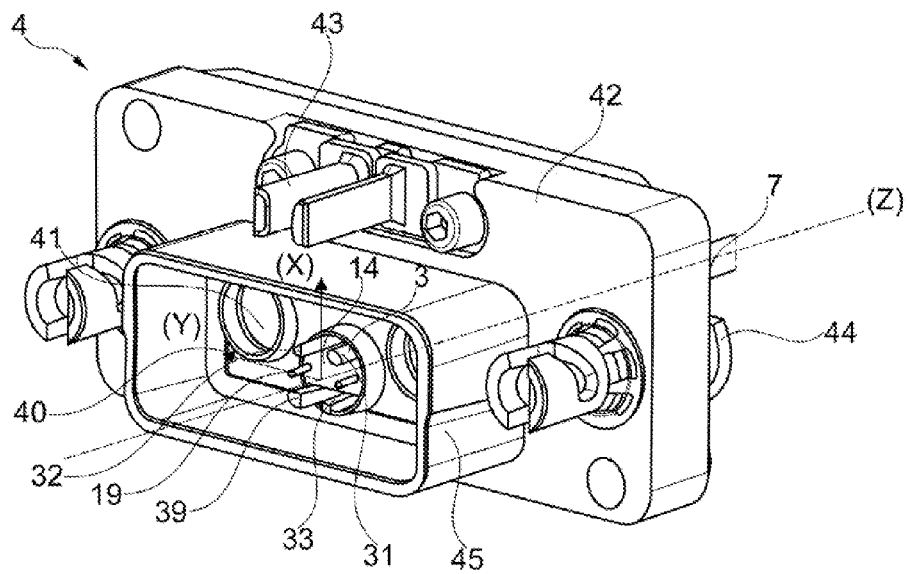
FIG. 8A is a view in perspective of the multi-contact connector according to FIG. 6 accommodating an optical contact according to the invention.
Figure 8B:
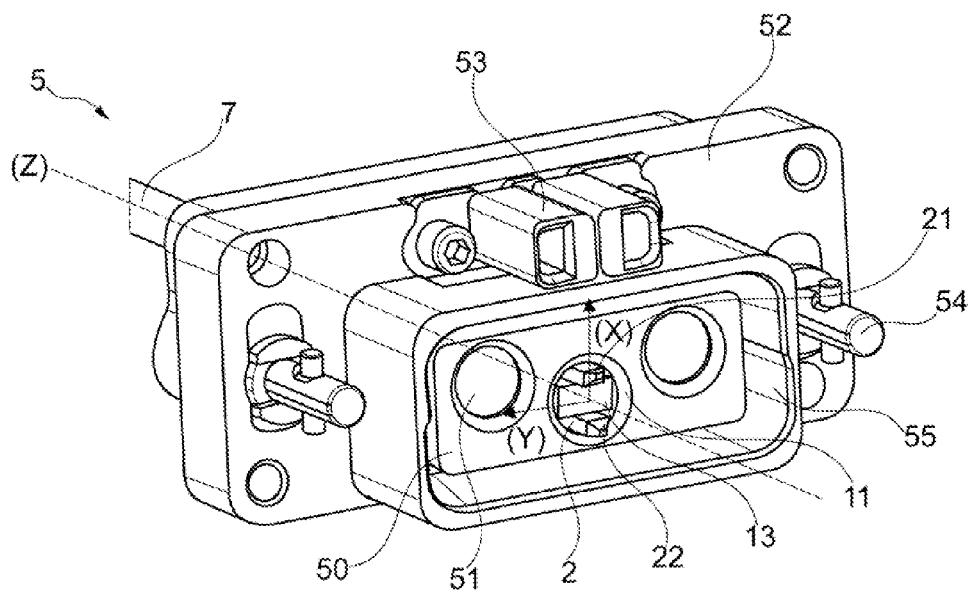
FIG. 8B is a view in perspective of an EPX multi-contact connector complementary to that in FIG. 7, accommodating a complementary optical contact according to the invention.

The above-described examples of the optical contacts 2, 3 for a connection assembly 1 may be arranged individually in cylindrical cavities of a multi-contact connector, known as EPX, as represented in perspective in FIGS. 7, 8A and 8B.

There are two complementary connectors of the EPX type. The first connector 4 represented in FIGS. 7 and 8A comprises a housing body 42, in which there is arranged an insert 40 comprising in its interior three cylindrical cavities 41 which each open onto the front face of the multi-contact connector 4.

The second multi-contact connector 5, which is complementary to the connector 4 represented in FIG. 8B, also comprises a housing body 52 in which there is arranged an insert 50 which is also complementary to three cylindrical cavities 51 which open onto the front face of the multi-contact connector 5.

The insert 40 is arranged in a guide portion 45 which is designed to cooperate with a guide portion 55 of the complementary insert 50.

On the housing body 42, two guide arms 43 are arranged above the insert 40, and are designed to cooperate with the guide cavities 53 of the housing body 52.

Two locks 44 are arranged on both sides of the insert 40, and are designed to cooperate with locking catches 54 of the insert 50 of a complementary multi-contact EPX connector 5.

Such complementary multi-contact connectors 4, 5 of the EPX type may each accommodate respectively the optical contacts 2, 3 of the connection assembly 1 according to the invention.

Thus, as represented in FIGS. 8A and 8B, the first multi-contact connector 4 accommodates the optical contact 3 of the connection assembly 1 in one of its cylindrical cavities 41, and the second multi-contact connector 5 accommodates the optical contact 2 of the connection assembly 1 in one of its cylindrical cavities 51. As illustrated, a single one of the cavities 41, 51 of the EPX connectors 4, 5 is occupied by an optical contact 2, 3, but it is possible to accommodate another optical contact or another type of contact in each of the other cavities.

In order to create the connection between two complementary connectors of the EPX type 4, 5 when the optical contacts 2, 3 of the connection assembly 1 are accommodated in cylindrical cavities 41, 51, in addition to the steps already described, the following supplementary steps are carried out:

a0/ guiding to alignment of the housing bodies 42 and 52 towards one another by means of the guide portions 44 and 45 and by means of the guide arms 43 which penetrate into the guide cavities 53.

a1/ placing optical contacts 2 and 3 opposite one another, with putting into contact of the first 13 and second 14 ferrules, and placing their optical channels 70 individually opposite one another.

d/ locking of the locks 44 by means of the catches 54.

The connection steps have been described for multi-contact connectors of the EPX type.

However, other steps may also be implemented for any multi-contact connector with a standard cylindrical cavity with a reduced diameter. For example, a screwing step may be envisaged as for a multi-contact connector of the 38999 type, or a step of locking by means of a card as for a multi-contact connector of the ARINC type.

Figure 9:
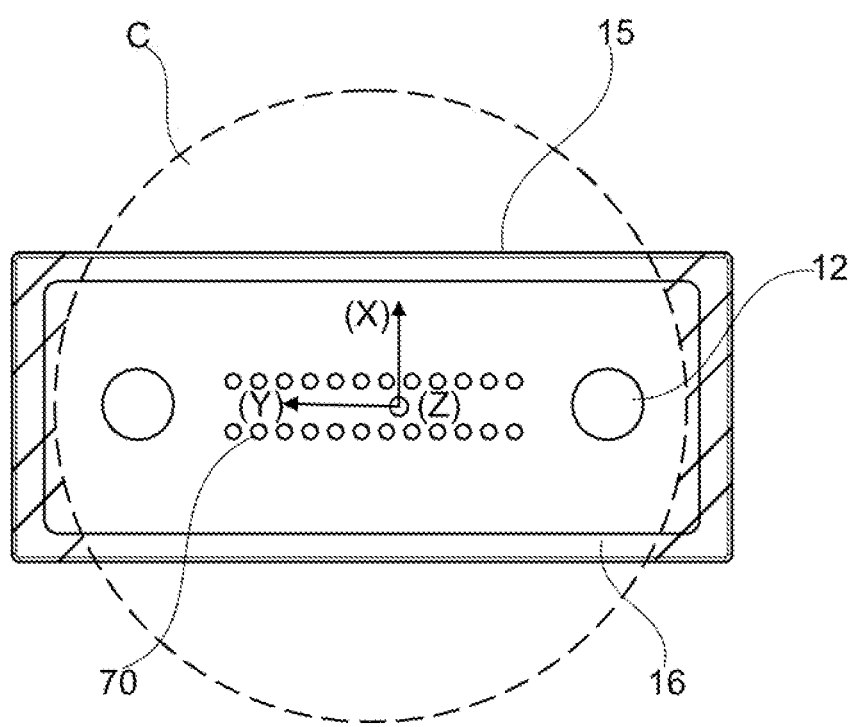
FIG. 9 is a front view of a ferrule according to the prior art, of the MT type, wherein the hatched part represents the material to be removed in order to permit insertion in a standard "size 8" cavity, symbolized by the circle C.

FIG. 9 represents a ferrule according to the prior art of the MT type, with the hatched part which must be removed according to the invention in order to permit insertion in a standard cavity of size 8 symbolized by the circle C.

Other variants and improvements may be created without departing from the context of the invention.

The expression "comprising a" must be understood as being synonymous with "comprising at least one", unless otherwise specified.

The invention claimed is:

1. Optical connection assembly comprising:
a first optical contact comprising at least one body which is designed to envelop a first ferrule at least partly, laterally, and constitutes the receptacle for the first ferrule, at least a first guide arm extending beyond the front face of the first ferrule, and at least a second guide arm beyond which the body of the ferrule extends;
a second optical contact comprising at least one body which is designed to envelop a second ferrule at least partly, laterally, and constitutes the receptacle for the second ferrule, and at least one guide means extending beyond the front face of the ferrule, being directly in contact with the second ferrule in the extension of the body, and being designed to cooperate with the first guide arm of the first optical contact, in order to carry out the guiding, then the connection, between the first and second optical contacts.

2. Optical connection assembly according to claim 1, the first ferrule and the second ferrule each having a form which is elongate according to a longitudinal axis (Z) and comprising a plurality of optical channels which are designed to accommodate an optical fiber individually, the optical channels being aligned according to a row, and opening onto one of the faces, known as the front face, of the first ferrule and the second ferrule, the transverse cross-section of the first ferrule and the second ferrule comprising:
two parallel segments with the same mid-perpendicular and the same length;
two profiles in the form of an arc of a circle which are convex towards the exterior of the ferrule, each of the two profiles connecting an end of a segment to the closest end of the other segment.

3. Optical connection assembly according to claim 1, the first ferrule and the second ferrule each having a form which is elongate according to a longitudinal axis (Z) and comprising a plurality of optical channels which are designed to accommodate an optical fiber individually, the optical channels being aligned according to a row, and opening onto one of the faces, known as the front face, of the first ferrule and the second ferrule, the transverse cross-section of the first ferrule and the second ferrule being a convex polygon with at least six sides, wherein there are:
- two first parallel segments with the same mid-perpendicular and the same length;
- two profiles each comprising at least two second segments, each profile connecting an end of a first segment to the closest end of the other first segment.

4. Optical connection assembly according to claim 3, the transverse cross-section of the first ferrule and of the second ferrule being an octagon wherein six of the sides have equal lengths constituted by the two profiles with three segments with lengths which are equal.

5. Optical connection assembly according to claim 1, the first ferrule and the second ferrule each having a parallepipedic shape which is elongate according to a longitudinal axis (Z) and comprising a plurality of optical channels which are designed to accommodate an optical fiber individually, the optical channels being aligned according to a row, and opening onto one of the faces, known as the front face, of the first ferrule and the second ferrule.

6. Optical connection assembly according to claim 1, the first or the second ferrule comprising at least one pin receptacle which is elongate according to the axis (Z), and opens onto the front face of the ferrule.

7. Optical connection assembly according to claim 6, the second ferrule or the first ferrule comprising at least one pin which is designed to be accommodated in a receptacle, the pin extending beyond the front face of the ferrule towards the exterior of the latter.

8. Optical connection assembly according to claim 1, the body of the first optical contact and the body of the second optical contact having a generally cylindrical form.

9. Optical connection assembly according to claim 1, the first optical contact comprising two second guide arms and two first guide arms which are diametrically opposite in pairs.

10. Optical connection assembly according to claim 1, the guide means of the second optical contact consisting of two pairs of two arms which are elongate according to the axis (Z) and diametrically opposite in pairs, whilst defining between one another four slots which are elongate according to the axis (Z).

11. Optical connection assembly according to claim 1, the guide means of the second optical contact consisting of two arms which are elongate according to the axis (Z), each comprising in their interior a groove which is elongate according to the axis (Z), the groove being designed to receive and guide in translation according to the axis (Z) a first guide arm for the first optical contact.

12. Optical connection assembly according to claim 1, the first and second optical contacts constituting contacts which are designed to be inserted in cylindrical cavities with a standard size, known as "size 8".

13. Multi-contact connector comprising:
- an insert comprising a plurality of cylindrical cavities;
- a first optical contact or a second optical contact of the connection assembly according to claim 1;
- at least one guide means which is designed to guide the multi-contact connector during its connection to a complementary multi-contact connector.

14. Method for connection of a multi-contact connector according to claim 13, with a complementary multi-contact connector according to claim 13, comprising the following steps:
- guiding to alignment of the multi-contact connectors by means of means for guiding the connectors;
- guiding to alignment of the optical contacts by means of the arm(s) and the means for guiding the optical contacts;
- putting the first and second ferrules into contact, with individual placing opposite one another of their optical channels.

* * * * *